June 27, 1972 S. T. CARTER 3,673,043

APPARATUS FOR ADHESIVELY APPLYING SEALING STRIPS TO CONTAINER CLOSURES TO PREVENT UNAUTHORIZED REMOVAL OF THE CLOSURES WITHOUT DETECTION

Filed Oct. 7, 1970 8 Sheets-Sheet 1

June 27, 1972 S. T. CARTER 3,673,043

APPARATUS FOR ADHESIVELY APPLYING SEALING STRIPS TO CONTAINER CLOSURES TO PREVENT UNAUTHORIZED REMOVAL OF THE CLOSURES WITHOUT DETECTION

Filed Oct. 7, 1970 8 Sheets-Sheet 4

APPARATUS FOR ADHESIVELY APPLYING SEALING STRIPS TO CONTAINER CLOSURES TO PREVENT UNAUTHORIZED REMOVAL OF THE CLOSURES WITHOUT DETECTION

Filed Oct. 7, 1970 8 Sheets-Sheet 6

3,673,043

APPARATUS FOR ADHESIVELY APPLYING SEALING STRIPS TO CONTAINER CLOSURES TO PREVENT UNAUTHORIZED REMOVAL OF THE CLOSURES WITHOUT DETECTION

Sidney T. Carter, Shrewsbury, Mass., assignor to A-T-O Inc., Cleveland, Ohio

Filed Oct. 7, 1970, Ser. No. 78,652
Int. Cl. B65c *3/20*
U.S. Cl. 156—363 38 Claims

ABSTRACT OF THE DISCLOSURE

Apparatus for adhesively applying sealing strips, for example, tax stamps, to the closures at the tops of containers comprising a wheel rotatable about a horizontal axis which has on it at spaced intervals grippers for clamping the sealing strips at one end thereto and affixing assemblies for applying sealing strips to the closures following application of adhesive thereto. Peripherally of the wheel there are at the top, a magazine for holding sealing strips and a picker for taking sealing strips from the magazines and presenting them to the grippers on the wheel; at one side adhesive-applying means for applying adhesive to the sealing strips; and at the bottom a conveyor for moving containers in succession to the wheel for application of the sealing strips thereto. The picker is controlled by a sensing device so as to remove sealing strips from the magazine only when there is a container on the conveyor ready to have a sealing strip applied thereto. The grippers are adjustable on the wheel relative to the affixing assemblies to center them with respect to the affixing assemblies for applying the sealing strips with equal portions at each side of the closures or to offset them for applying sealing strips to closures which are long from top to bottom with one end longer than the other so that at least one end overlaps the lower end of the closure. The adhesive applicator is provided with a grooved applicator roll for applying adhesive only to the marginal edges of the sealing strip so as to leave the center portion uncoated. A heated guide situated between the applicator roll and the place of application of the sealing strips keeps the adhesive liquid as the sealing strips are moved from the applicator roll to the place of application. The affixing assemblies comprise holding members which take hold of the ends of the sealing strips while still held at one end by the gripper and a spotter. The holding members and spotter are movable radially on the wheel toward the tops of the containers and relative to each other after a sealing strip is pressed against the top of a container to wipe the portions of the sealing strip at each side of the closure downwardly against the sides while holding the ends away from the container so that the ends will not become attached to the shoulders of the container. Alternately when the sealing strip is being applied to a long-necked bottle and there is no problem of bridging, the end portions of the sealing strip may be released at the time of application of the sealing strip to the closure. The sealing strip holding members are vacuum devices which hold the sealing strip ends until the sealing strip is applied, whereupon they are disabled and superatmospheric pressure is supplied to effect release and/or to blow the ends of the sealing strip free. The drive for the wheel embodies means for rotating the wheel at a speed compatible with picking the sealing strips from the magazine and applying adhesive most expeditiously and a pair of eccentric drive gears designed to speed up the rotation or slow it down as the case may be each time an assembly nears the place of application to synchronize the speed of the assembly with the linear speed of the containers. There is also means associated with the means for effecting radial movement of the assemblies at the place of application adapted to yield in the event of an oversize container to prevent shattering.

BACKGROUND OF THE INVENTION

Apparatus for adhesively applying strip stamps is disclosed in the Clark Pat. No. 3,049,166. In this patent there is shown a wheel for carrying the strip stamps from a holder to an adhesive applicator for application of adhesive and from thence to a position for application to a top of a container. In the aforesaid patent the strip stamp is removed from the bottom of a magazine of strip stamps and clamped at both ends to the wheel and while so held moves successively into engagement with the peripheral surface of the applicator which applies adhesive to the entire surface of the strip stamp and then to a position above the top of the container. Such application of adhesive to the entire surface of the strip stamp is wasteful of adhesive; moreover, the proximity of the peripheral surface of the wheel to the adhesive applicator roll is such that adhesive is transferred to the wheel. Consequently, frequent cleaning is necessary, and this requires interrupting continuous operation of the machine with a very considerable loss of productivity. In the aforesaid machine, when a strip stamp is applied to the top of a bottle, the end portions of the strip stamp are immediately released, and if the container or bottle has a short neck, the end portions drop down over the shoulders and become attached thereto bridging the angles between the neck and the shoulders. Consequently when the container is moved on to the squeezing devices, the latter when brought into engagement with the bridged portions of the strip stamp, tears the strip stamp. Furthermore, since the spotter in the aforesaid machine only applies the center of the strip stamp to the top of the closure and the squeezers are relied upon to apply the end portions to the sides and do not apply a downwardly wiping motion to the ends of the strip stamp, the folds at the corners where the strip stamp is bent over from the flat surface at the end of the closure on to the side surfaces are somewhat dog-eared and unattractive. The present invention is for the purpose of providing a machine of the foregoing kind designed especially to eliminate the disadvantages referred to and in addition to provide improved means for extracting the sealing strip from the sealing strip holding magazine only when a container will be in a position for application of a sealing strip thereto, improved means for applying adhesive to the sealing strip and for keeping it liquid, improved means for holding the sealing strips at one end only to the wheel while being moved to the adhesive-applying means, and for holding the adhesive coated sealing strip at both ends in centered or offset relation for spotting the sealing strip, wiping portions thereof into engagement with the sides of the closure and optionally withholding the ends or releasing the ends. Other purposes are to enable use of the apparatus for applying sealing strips to long-neck containers as well as short-neck containers, eliminate breakage due to oversize containers, and for rotating the wheel at a speed such that during the interval an applicator is in a position to press a sealing strip into engagement with a closure at the top of the container, it travels along at a speed corresponding to that of the container.

SUMMARY

As herein illustrated, the apparatus comprises a wheel rotatable relative to a magazine containing a stack of uncoated sealing strips, for example, tax stamps, to transport the lowermost sealing strip from the stack to an applicator for applying adhesive thereto, and thereafter to a position for application to the closure at the top of the container by first spotting the sealing strip on the top of the closure, then folding portions of the sealing strip adjacent thereto downwardly into engagement with the sides of the closure, and finally releasing the end portions of the sealing strip for movement beyond the spotting and folding means to a position for pressing said end portions into engagement with the sides of the container below the closure. A picker controlled by a sensing device operable in response to the presence of a container removes one end of the lowermost sealing strip from the magazine to a position adjacent the wheel, and a sealing strip end gripper on the wheel clamps the leading end of the sealing strip to the wheel for movement therewith. Movement of the wheel following clamping of the leading end of the sealing strip thereto withdraws the trailing end of the sealing strip from the magazine. The trailing end of the sealing strip as the wheel rotates toward the adhesive applicator which comprises an applicator roll, is held away from the peripheral surface of the wheel by centrifugal action, and there is a guide adjacent the adhesive applicator roll for receiving the outflung sealing strip, and, while holding it away from the surface of the wheel, guiding it in a plane tangent to the applicator roll for application of adhesive thereto. The adhesive applicator roll is grooved to apply adhesive only to the marginal portions of the sealing strips leaving the central portions of the sealing strips bare of adhesive. The peripheral surface of the wheel is spaced from the adhesive applicator roll and the end grippers comprise jaws mounted on the wheel which hold the clamped end of the sealing strip spaced from the wheel for movement along the path tangent to the surface of the adhesive applicator roll. A pair of sealing strip end holding members are mounted on the wheel for radial movement relative thereto and these are movable radially following application of the adhesive to the sealing strip to engage the opposite ends of the sealing strip and to hold it to the wheel independently of the gripper and in a plane substantially perpendicular to a radius of the wheel. Intermediate the sealing strip end holding members there is a spotter having a flat face situated in the plane of the sealing strip end holding members, the spotter being movable radially with the sealing strip end holding members and relative thereto. The sealing strip end holding members and spotter move with the wheel and in conjunction, position the sealing strip above the closure at the top of the container. At this position the sealing strip end holding members and spotter move radially on the wheel from a position above the container closure to a position beyond the closure in the direction of the bottom, and during this movement, the spotter presses the sealing strip downwardly against the top of the closure and the sealing strip end holding members move toward each other, folding the portions of the sealing strip at each side of the closure downwardly into engagement with the sides thereof. There are wiper members on the sealing strip end holding members movable therewith towards the sides of the closure during the downward movement, which wipers press the downwardly folded portions of the sealing strip into engagement with the sides of the closure while the ends are still held away from the sides of the container. Following application of the sealing strip to the closure, the ends of the sealing strip are released from the sealing strip end holding members, whereupon the spotter and sealing strip end holding members are retracted. Optionally, the grippers are adjustable relative to the sealing strip end holding members to enable positioning the sealing strip on the wheel in centered relation to the spotter or in offset relation thereto.

There are a plurality of sealing strip end holding members and spotting assemblies mounted on the wheel in peripherally spaced relation and each is connected to a centrally mounted manifold by means of which the sealing end holding members may, at times, be connected to subatmospheric pressure to hold the ends of the sealing strip to the sealing strip end holding members and at times to superatmospheric pressure to release the ends of the sealing strip from the sealing strip end holding members. The assemblies are movable radially by interengagement of a follower on each with a cam track and to prevent breakage in the event that permissible yield of the spotter is exceeded by an oversized container, there is a spring-loaded gate in the track which yields and a switch operable thereby, if the yield exceeds a predetermined amount, to shut off the motor drive. The apparatus is designed to apply sealing strips to bottles delivered thereto by a conveyor moving at a constant speed with the containers located thereon at a predetermined constant spacing and the drive means for the wheel embodies means in the form of a pair of eccentric gears designed to adjust the speed of rotation of the wheel so that at the place of application the linear speed of the assemblies corresponds to the speed of linear movement of the containers on the conveyor.

The invention will now be described in greater detail with reference to the accompanying drawings, wherein.

Figure 27:
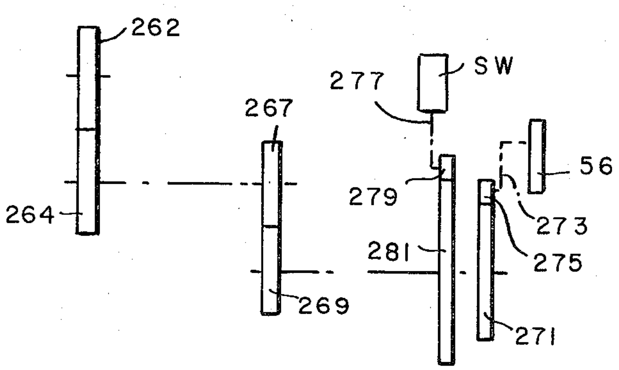
Figure 26:
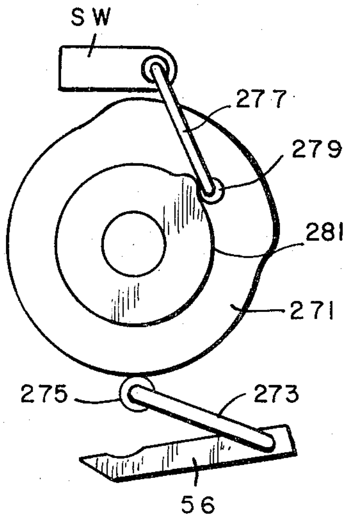
FIG. 26 is an elevation of cam means for effecting operation of the picker and a control switch to prevent picking in the absence of a container.
Figure 29:
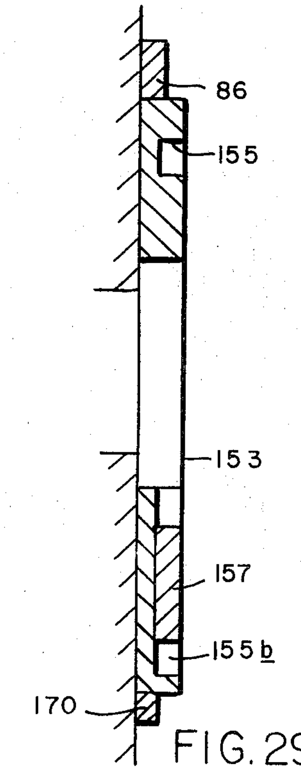
Figure 28:
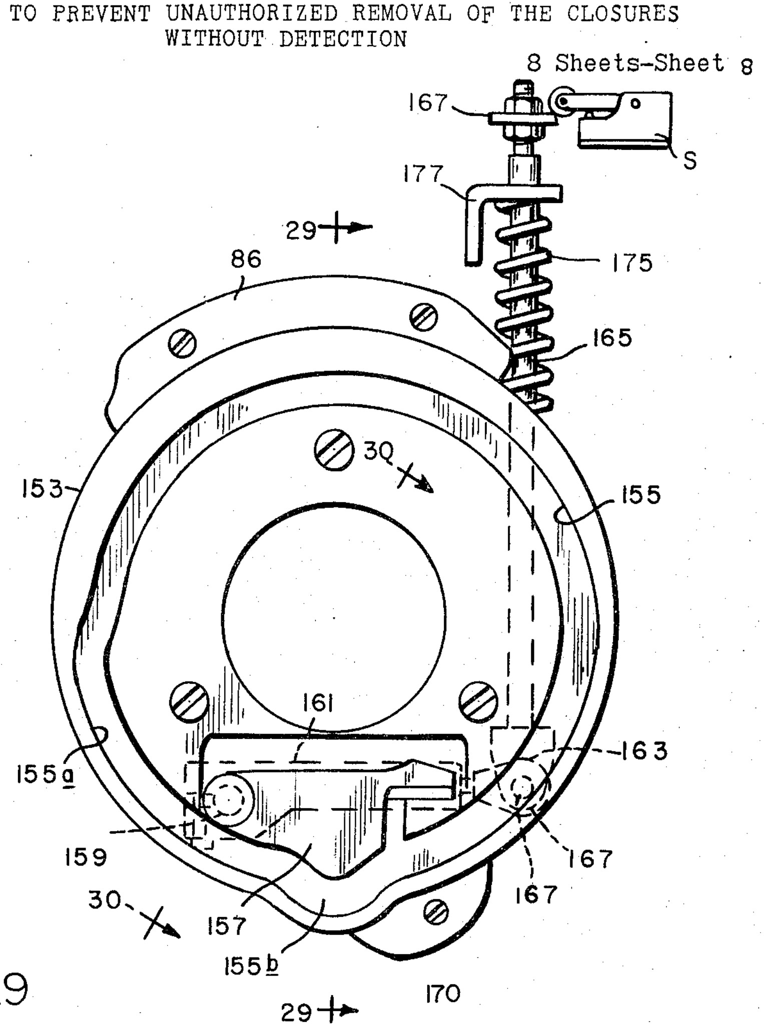
Figure 30:
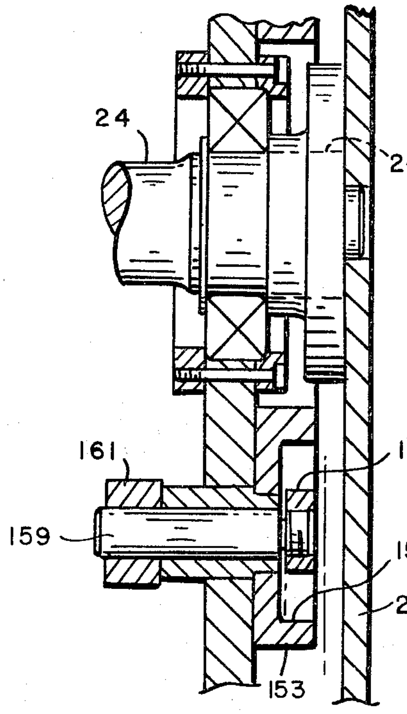

FIG. 27 diagrammatically illustrates the drive for the cams shown in FIG. 26;

FIG. 28 is an elevation of the cam plate for effecting radial movement of the sealing strip affixing assemblies including safety mechanism;

FIG. 29 is a section taken on the line 29—29 of FIG. 28;

FIG. 30 is a section taken on the line 30—30 of FIG. 28; and

Figure 31:
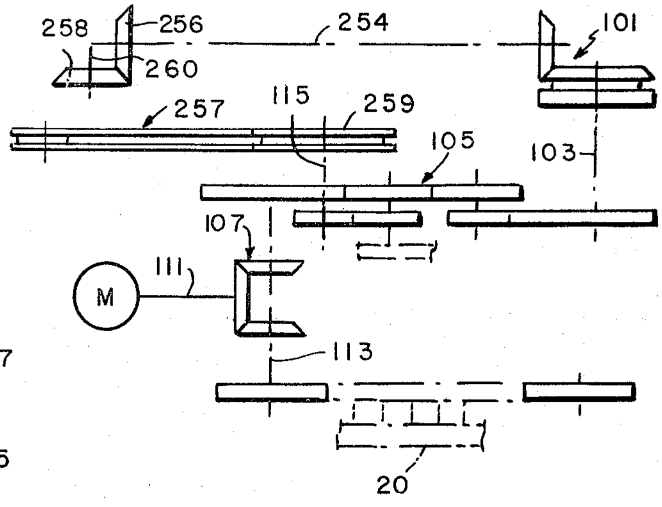

FIG. 31 diagrammatically illustrates the drive by means of which the several components of the apparatus are driven in synchronism.

Referring to the drawings (FIG. 1) the sealing strip applying apparatus 10 is shown in its relation to a labeling machine, the delivery end of which is shown at 12, and to an accessory to the sealing strip applying machine comprising squeezing means 14 for squeezing the end portions of the sealing strip into engagement with the sides of the containers after the sealing strips have been spotted on the closures and wiped into engagement with the sides of the closures. As herein illustrated the applying apparatus is an integral part of the labeling machine and the squeezing apparatus.

The containers to which the sealing strips are being applied are illustrated herein as bottles 16 (FIG. 1) provided with closures 18 in the form of internally threaded caps screwed to the necks of the bottles. However, it is to be understood that the kind of closure is not critical nor the kind of container in that the same manner of applying sealing strips may be advantageously employed for applying sealing strips to containers other than bottles and to closure members other than screw caps.

In accordance with the invention the containers which have been previously labeled are moved from the labeling machine 12 directly to the sealing strip applying apparatus 10 by a conveyor 20 on which the bases of the containers rest—the conveyor being supported at a level such that the tops of the bottles with the caps thereon travel along in substantially horizontal plane *a* beneath the lower side of a transfer and spotting wheel 22 of the sealing strip applicator hereinafter to be referred to as the wheel 22 and from thence to the sealing strip squeezing means 14, the containers being rigidly clamped throughout this movement by clamping means 24 engaged with their bases. The conveyor 20 may be a continuation of the conveyor employed in the labeling machine or may be separate therefrom but driven at the same speed so that the containers move from one to the other.

Figure 14:
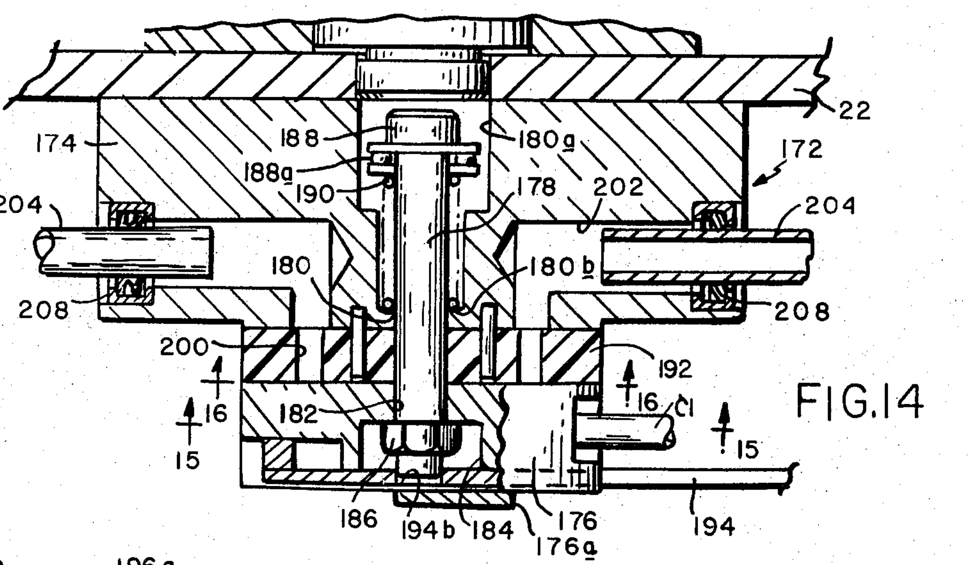
FIG. 14 is a section taken on the line 14—14 of FIG. 3.
Figure 17:
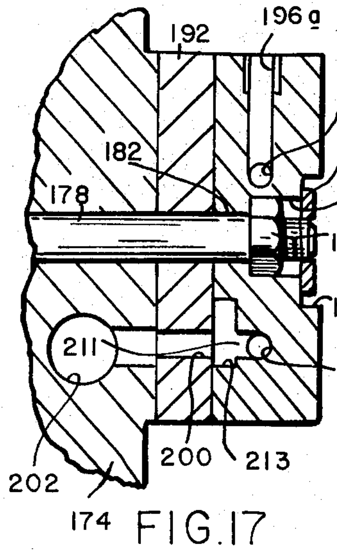
FIG. 17 is a section taken on the line 17—17 of FIG. 15.
Figure 18:
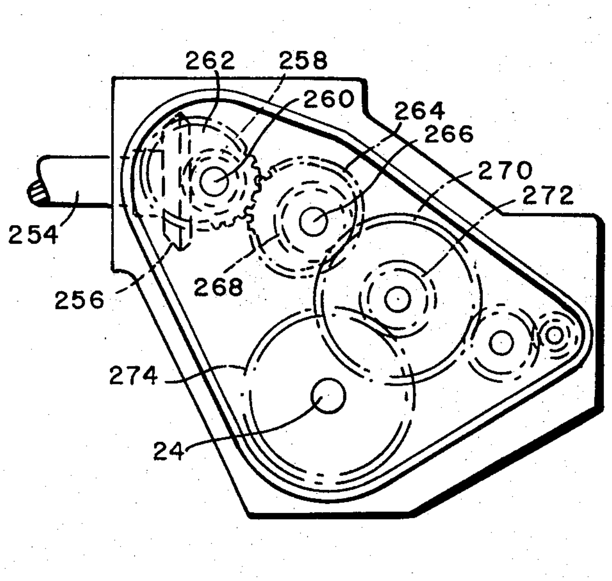
FIG. 18 is an elevation of part of the drive for the wheel.
Figure 19:
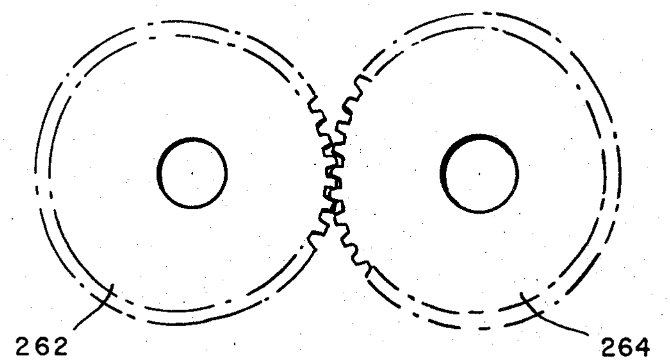
FIGS. 19, 20 and 21 are plan views of three pairs of eccentric gears employed in the drive shown in FIG. 18 to adapt the apparatus for applying sealing strips to bottles at different spacings.

The wheel 22 is mounted for rotation about a horizontal axis perpendicular to the path of movement of the conveyor 20 on a shaft 24 (FIGS. 14, 18 and 30), rotation of which is effected by suitable means later to be described. The wheel 22 has on it at peripherally spaced points (FIG. 3) sealing strip gripping means 24, sealing strip end holding means 26—26 and sealing strip spotting means 28 and peripherally thereof a sealing strip holding magazine 30 and adhesive applicator means 32.

The sealing strip holding magazine 30 (FIG. 2) is supported at the upper side of the wheel 22 in a forwardly and downwardly inclined position with respect to the direction of rotation of the wheel so that its forward end is adjacent the peripheral surface of the wheel. The bottom of the sealing strip magazine is provided with a downwardly and forwardly inclined shelf 32 on which the lowermost sealing strip *t* of the stack rests and a bottom opening 34 through which the lower end of the lowermost sealing strip is exposed. The front wall of the magazine 30 is provided with a pivotally supported gate 36 mounted on a pin 38 to swing forwardly from the plane of the forward wall and is adjustable to a predetermined selected position by means of a screw 40 threaded through a yoke 42, the latter being supported by trunnions 44—44 between a pair of slotted bracket plates 46—46 fastened to the sides of the magazine. One end of the screw is pivotally connected by means of a screw bolt 48 to the gate and the other end has on it a knob 50 by means of which it may be rotated to displace the gate in one direction or the other. Preferably the gate 36 is inclined so as to hold the lower ends of the sealing strips inclined forwardly from top to bottom. By adjustment of the gate the forward ends of the sealing strips may be shifted forwardly or rearwardly relatively to the wheel.

The portion of the stack within the opening 34 forwardly of the shelf 32 is releasably supported at opposite edges by relatively short pins 52—52 fixed in the magazine at opposite sides of the opening. Optionally, jets may be supported at opposite sides to riffle the lowermost sealing strip to facilitate separation.

A picker 54 (FIG. 2) is supported between the bottom of the magazine and the surface of the wheel, the picker comprising an arm 56 pivotally supported at its rear end within the opening on a shaft 58 for movement to a position parallel to the lowermost sealing strip in the magazine to a position inclined downwardly toward the periphery of the wheel. The arm 56 contains in its upper surface an opening 60 which is connected to a source of low pressure (subatmospheric pressure) so that when the arm is moved upwardly into engagement with the lowermost sealing strip the sealing strip will be gripped and when the arm is moved downwardly to the position shown in FIG. 2, the leading end of the sealing strip will be pulled downwardly from engagement with the pins 52—52 to a position close to the gripping means 24. Movement of the arm 56 is effected and controlled as will appear hereinafter to pull a sealing strip from the bottom of the stack each time a container is on the conveyor in a position such that it will be present for application of the sealing strip thereto.

Figures 3, 4, 5, 6, 7, 8:
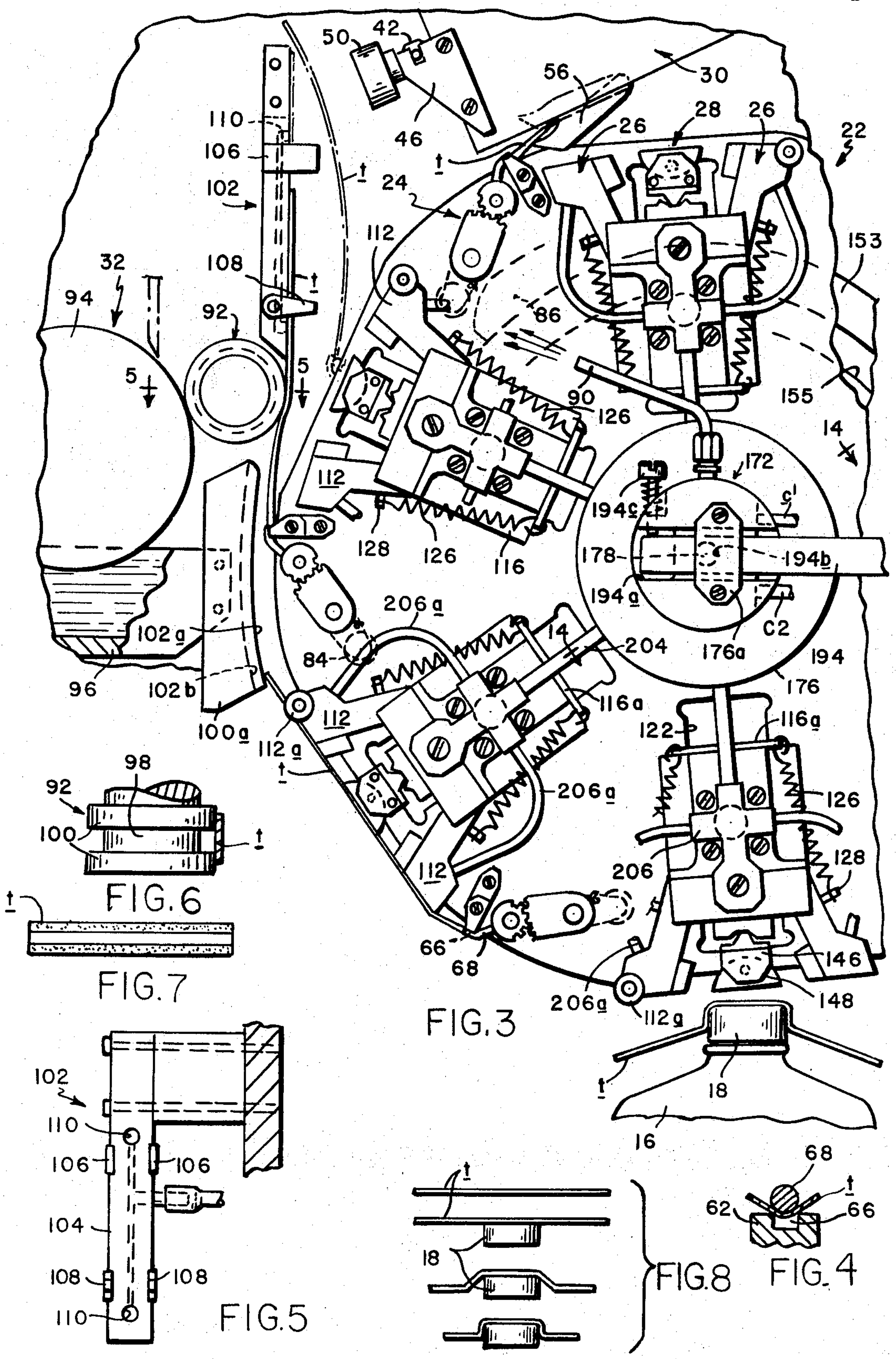
FIG. 3 is a fragmentary elevation of the wheel showing the sealing strip in successive positions starting with the withdrawal from the sealing strip magazine, its movement into position for application of adhesive thereto, its support at both ends beyond the adhesive-applying means in a plane perpendicular to the radius of the wheel, and finally its application to the top of a container.
FIG. 4 is a fragmentary cross-section of the clamping means taken transversely of the wheel.
FIG. 5 is an elevation of the sealing strip guiding means by means of which the sealing strip is guided into engagement with the adhesive applicator roll.
FIG. 6 is an elevation of the adhesive applicator roll.
FIG. 7 is an elevation of the adhesive-coated side of the sealing strip to which adhesive has been applied.
FIG. 8 is a diagrammatic view showing progressively the configuration of a sealing strip from the time it is moved into position above the top of the container until it is completely applied to the closure.

The sealing strip gripping means 24 comprises a fixed jaw 62 (FIG. 2) and a movable jaw 64. The fixed jaw is mounted on the wheel so that the sealing strip engaging portion thereof protrudes radially from the wheel. The end face of this jaw contains a recess 66 of rectangular cross-section (FIG. 4). The movable jaw 64 comprises a finger 68 of circular cross-section adapted by engagement with the leading end of a sealing strip to press the latter into the recess 66 of the fixed jaw and by such interengagement to bend the sealing strip transversely between its opposite edges, as shown in FIG. 4, thus holding the opposite sides of the sealing strip upwardly. The finger 68 is fixed to a gear sector 70 pivotally supported on the wheel by a pin 72.

A second gear sector 74 is mounted on the wheel in engagement with the gear sector 70, by means of a pin 76. A spring 78 coiled about the pin 76, with one end fixed to the gear sector 74 and the other end constrained by a lug 80, mounted on the wheel 22, biases the gear sector 74 in a counterclockwise direction which in turn biases the gear sector 70 in a clockwise direction so as to press the finger 68 into engagement with the jaw 62. The pin 76 extends through the wheel to the back side and has fixed to it a radially projecting arm 82 on which there is pivotally mounted a cam roller 84 adapted, by engagement with a cam 86, to pivot the gear sector 74 in a clockwise direction and thereby to rotate the gear sector 70 in a counterclockwise direction to disengage the finger 68 from the recess 66 of the fixed jaw 62. The cam 86 is located at the rear side of the wheel and positioned so that as the wheel rotates in a counterclockwise direction toward the picker, the finger 68 of the gripping means 24 will be disengaged from the recess 66 of the fixed jaw, as shown in dotted lines in FIG. 2, to allow the picker to bring the leading end of the sealing strip downwardly into engagement with the fixed jaw. At about this point, the roller 84 runs off the cam 86, allowing the spring 78 to move the finger 68 down into clamping engagement with the recess 66 of the fixed jaw.

It is to be observed (FIG. 2) that the fixed jaws 64 support the leading ends of the sealing strips radially of the peripheral surface of the wheel and that they also buckle the leading ends of the sealing strips transversely.

As the wheel 22 rotates in a counterclockwise direction it pulls the lowermost sealing strip, which as related above, is held at its leading end between the jaws 62, 64 from the magazine and as the sealing strip clears the forward end of the magazine, due to the centrifugal action, that is, the speed of rotation of the wheel, the free trailing end of the sealing strip is thrown outwardly away from the wheel, as shown in dotted lines in FIG. 3. To augment this outward displacement of the trailing end of the sealing strip away from the peripheral surface of the wheel there is provided a nozzle 90, FIG. 3, supported in a fixed position at the center of the wheel. The nozzle 90 is connected to a source of air pressure, as will appear hereinafter, and is disposed in a position to direct a jet of air under pressure toward the front side of the sealing strip as it is moving between the sealing strip magazine and the adhesive applicator means to blow the sealing strip away from the peripheral surface of the wheel.

The means 32 for applying the adhesive to the sealing strip comprises an adhesive applicator roll 92 (FIG. 3), a pick-up roll 94 and a receptacle 96 for holding a quantity of molten or liquid adhesive. The adhesive applicator roll 92, as shown in FIG. 6, contains a medial groove 98 peripherally thereof, defining spaced flanges 100—100 which are adapted to apply adhesive to the marginal edges of the sealing strip, leaving the central portion bare of adhesive, as shown in FIG. 7. The adhesive applicator 92 is wider than the sealing strip and is mounted for rotation about a horizontal axis parallel to the axis of the wheel with its peripheral surface spaced from the peripheral surface of the wheel so that there is no chance for adhesive on the surface of the adhesive applicator roll to be transferred to the surface of the wheel. The spacing is such that the locus of the point where the fixed and movable jaws engage each other is substantially tangent to the surface of the adhesive applicator roll, so that the upwardly lifted sides of the leading ends of the sealing strip held between the jaws will have contact with the surface of the adhesive applicator roll as they travel by the adhesive applicator roll.

As constructed, the bearings for both the adhesive applicator roll and the pick-up roll are located above the receptacle 96 containing the adhesive and so clear of adhesive and the problems involved in maintaining the shafts freely rotatable in their bearings.

In order to conduct the entire length of the sealing strip in engagement with the adhesive applicator roll a guide 102 (FIGS. 3 and 5) is mounted above the adhesive applicator roll in a substantially perpendicular position which is provided with a flat surface 104 (FIG. 5) at opposite sides of which there are transversely spaced fingers 106—106 and 108—108, between which the edges of the sealing strip are adapted to be engaged to align the sealing strip with the surface of the adhesive applicator roll. The surface 104 is tangential to the surface of the adhesive applicator roll and contains openings 110—110 (FIG. 5) connected to a source of subatmospheric pressure so that the sealing strip is pulled against the surface of the guide and allowed to slide downwardly therealong in tangential engagement with the adhesive applicator roll as the wheel turns. During such tangential engagement with the adhesive applicator roll the sealing strip is held away from the peripheral surface of the wheel.

The adhesive applicator roll and pick-up roll are driven at different speeds. The pick-up roll 94 which is the larger is driven by a gear head synchronized motor at a rate of 6 r.p.m. and will stall out without damage in the event that the apparatus is started up before the adhesive becomes fluid so that no harm will be done. The adhesive applicator roll 92 is driven at a higher speed by suitable gearing, preferably at a speed so that its surface speed is the same as that of the wheel, thereby to effect a uniform transfer of adhesive to the sealing strip. The drive includes a conventional friction clutch so that if the two rolls become adhered to each other when the apparatus is not in use and the apparatus is started before the adhesive is melted, no damage will be done.

The difference in surface speed of the two rolls, that is, the adhesive applicator roll and pick-up roll, allows the pick-up roll to act as a metering device to control the thickness of the adhesive on the surface of the sealing strip. To provide for such control the pick-up roll 94 is mounted on a pivotally supported bracket 94*a* (FIG. 1) and a screw 94*b* provides for adjusting the bracket and hence the position of the pick-up roll relative to the adhesive applicator roll.

Directly below the adhesive applicator roll 92 there is means for maintaining the adhesive applied to the surface of the sealing strip liquid, comprising a heated guide 100*a* (FIG. 3) which has a curved surface 102*a* substantially concentric with the periphery of the wheel 22 for supporting the sealing strip as it leaves the adhesive applicator roll and for keeping the adhesive fluid. The guide, like the surface of the adhesive applicator roll, has a groove 102*b* medially thereof so as not to have contact with the uncoated surface of the sealing strip and is maintained at a temperature high enough to keep the adhesive liquid by conductance of heat from the receptacle 96 to which it is attached. As long as the temperature of the guide is kept high enough to keep the adhesive liquid, the movement of the sealing strip along the surface of the guide will not remove the adhesive from the sealing strip.

Figures 9, 10:
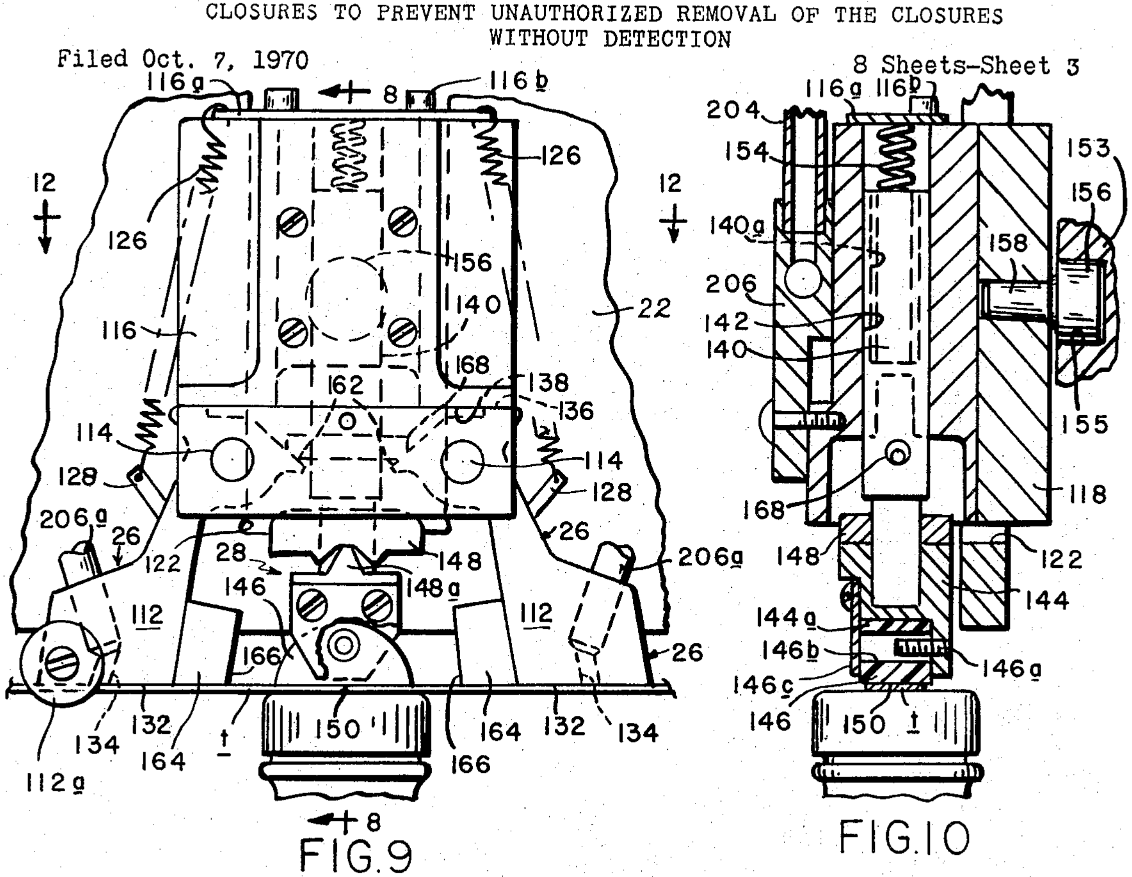
FIG. 9 is a fragmentary elevation of the sealing strip applicator assembly at the moment when the sealing strip is brought into engagement with the top of the bottle closure and the means for effecting its operation.
FIG. 10 is an elevation, partly in section, on the line 8—8 of FIG. 9.
Figures 11, 12, 13:
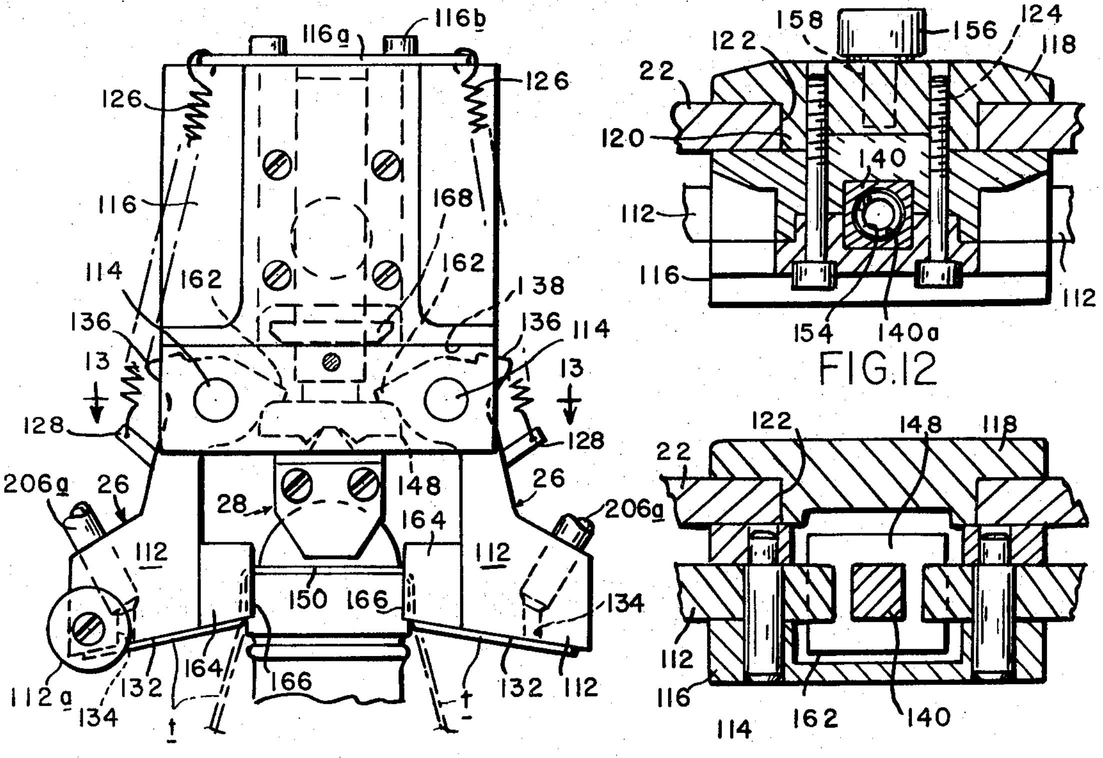
FIG. 11 is an elevation like FIG. 9 showing the sealing strip folded over onto the sides of the closure.
FIG. 12 is a section taken on the line 12—12 of FIG. 9.
FIG. 13 is a section taken on the line 13—13 of FIG. 11.

As the wheel 22 moves a sealing strip coated with adhesive from the adhesive applicator means toward the place of application to the top of the container, it is taken hold of at both ends by the sealing strip holding means 26—26 and is held in a flat plane perpendicular to the radius of the wheel as shown in FIG. 3. The sealing strip end holding means 26—26 for taking hold of the ends of the sealing strip as it leaves the heated guide comprises transversely disposed sealing strip end holding members 112—112 (FIGS. 3, 9 and 11) pivotally supported on pins 114—114 on a block 116 which is mounted on the wheel for movement radially toward and away from the axis of rotation. The block 116 is supported for radial movement against the face of the wheel by a gib plate 118 (FIGS. 10 and 12) which has a forwardly projecting tongue 120 which extends through a radial slot 122 in the wheel. The block 116 is secured to the gib 118 by screws 124. Radial movement of the block is controlled by a cam 153, as will be described hereinafter. The sealing strip end holding members 112—112 are held spaced from each other and from the sealing strip spotter means 28 by springs 126—126 (FIGS. 3, 9 and 11). The upper ends of the springs 126—126 are hooked and engaged with holes in a cover plate 116*a* secured to the top of the block 116 by screws 116*b* and the lower ends of the springs are hooked and engaged with holes in pins 128—128 fixed in the sealing strip end holding members 112—112. The sealing strip end holding members 112—112 have flat end surfaces 132—132 containing openings 134—134 adapted to be connected alternately with a source of subatmospheric pressure to hold the sealing strip ends engaged with the flat surfaces 132—132 and to be connected with a source of superatmospheric pressure to disengage or release the ends of the sealing strip from the sealing strip end holding members. The spread apart positions of the sealing strip end holding members 112—112 are limited by the engagement of shoulders 136—136 on the sealing strip end holding members with a shoulder 138 on the block 116. The leading edge of the sealing strip is held against lateral displacement by the grippers. To hold the trailing end of the sealing strip the holding members at that end are provided with spaced guide discs 112*a*—112*a* between which the edges of the sealing strip at that end are constrained.

Intermediate the sealing strip end holding members (FIGS. 9 to 13), as indicated above, there is sealing strip spotting means comprising a spindle 140 of rectangular cross-section supported in a vertically disposed hole of rectangular cross-section in the block 116 for radial movement relative to the block. The outer end of the spindle 140 has connected to it a spotting head 144 (FIG. 10) which pivotally supports a spotting member 146 for rocking about an axis parallel to the center of rotation of the wheel. The spotting member 146 is semi-cylindrical and is supported in a semi-cylindrical recess 144*a* in the head by a bolt 146*a* extending from the rear side of the head into the recess and a hole 146*b* of larger size than the bolt in the member 146. A cover plate 146*c* is secured over the front of the recess to retain the member in place. The diametrical side 150 of the spotting member faces outwardly and is permitted to rock angularly about the axis of the bolt 146*a* and because of the large hole to have limited downward movement within the recess. The spindle 140 has at its upper end an axial hole 140*a*. A spring 154 is disposed under compression in the hole with its upper end engaged with the cover plate 116*a*. The spring yieldably holds the spindle extended.

The block 116 is moved radially in the slot 122 (FIGS. 1 and 10) from a retracted position in which both the sealing strip end holding members 112—112 and the spotter 28 are held radially inward of the periphery of the wheel (FIG. 3) to a first position beyond the peripheral surface of the wheel, such movement taking place as a sealing strip is withdrawn from the heated guide to take hold of the ends of the sealing strip, then to a second position farther from the periphery of the wheel at the place of application of the sealing strip to the closure to spot the sealing strip on the closure and fold portions of the sealing strip at either side into engagement with the sides of the closure and finally back to its retracted position. Cam means in the form of a cam plate 153 (FIGS. 3, 28 and 29) containing a cam track 155 at the rear side of the wheel provides for effecting movement of the block to said first position for taking hold of the ends of the sealing strip, and then to said second position for spotting and folding the sealing strip into engagement with the top and sides of the closure, and finally retracting the block. A cam follower 156 (FIGS. 10 and 12) rotatably mounted on a pin 158 fixed in the gib 118 in engagement with the cam track 155 provides for effecting the aforesaid radial movement.

When the sealing strip end holding members and spotting head are moved into position above the closure (FIG. 3) the initial radial movement of the block 116 brings the member 146 of the spotting head 144 into engagement with the face of the sealing strip and presses the adhesive-coated side into engagement with the top of the closure (FIG. 9). At this time the ends of the sealing strip are held outspread by the sealing strip end holding members. Since the container is supported rigidly at the bottom by the conveyor 20, further movement of the spotting head 144 radially is prevented and so further radial movement of the block 116 effects movement of the sealing strip end holding members 112—112 relative to the spotting head—this being permitted by the fact that the spindle 140 is yieldable as related above.

A rocker plate 148 is mounted on the spindle above the head 144 astride a pair of diametrically disposed tapered bearings 148*a*—148*a*. The relative movement between the spotting head 144 and the sealing strip end holding members 112—112 brings the rocker plate 148 into engagement with the outer sides of ears 162—162 (FIG. 11) on the sealing strip end holding members so as to swing the sealing strip end holding members toward each other during their radial movement beyond the face 150 of the member 146 which has been stopped by engagement with the top of the bottle. Movement of the sealing strip end holding members toward each other folds the portions of the sealing strip at each side of the closure over the edges and downwardly along the sides of the closure and these downwardly folded portions are pressed into engagement with the sides by means of resilient pads 164—164 secured to the sealing strip end holding members which have surfaces 166—166 confronting each other and substantially parallel to each other at the opposite sides of the closure when brought into engagement therewith. Radial movement of the spindle 140 outwardly is limited by the opposite ends of a pin 168 fixed diametrically in the spindle by engagement of the inner sides of the ears 162—162 therewith.

The spotting member 146, as previously described, is pivotally supported so that its sealing strip engaging surface 150 can rock angularly sufficiently to compensate for the arcuate movement of the spotter as it approaches and leaves the horizontal plane of the tops of the closures to enable applying the spotting pressure substantially uniformly.

The assembly, as thus designed, is for containers having short necks (FIG. 3) so that the end portions of the sealing strips when folded over the edges of the closure will not extend down to the shoulders of the container and provides for this purpose for spotting the center of the sealing strip on the top of the closure, and, thereafter, by the combined downward and inward movement of the sealing strip end holding members, bending the portions of the sealing strip at each side of the center snugly over the edges of the closure onto the sides thereof while still holding the ends of the sealing strip outspread and hence away from the shoulders of the container. This avoids the possibility of the ends of the sealing strip from becoming accidentally attached to the shoulders during the spotting operation. Also the design of the assembly is such that if the neck of the container is off-center so that the resilient pad 164 at one side engages the side of the closure at that side before the other engages it, no loss of pressure will be sustained on the other side since the pressure at the one side will be equalized by the mechanism and applied to the other side in a like amount.

For short-neck bottles the ends of the sealing strip are held outspread until the assembly is about to be retracted and only then released. The free ends of the sealing strip are later pressed into engagement with the neck and shoulders of the bottle below the closure, that is, after the sealing strip end holding means and spotting means have been retracted; for example, by the squeezing means referred to heretofore.

Figure 25:
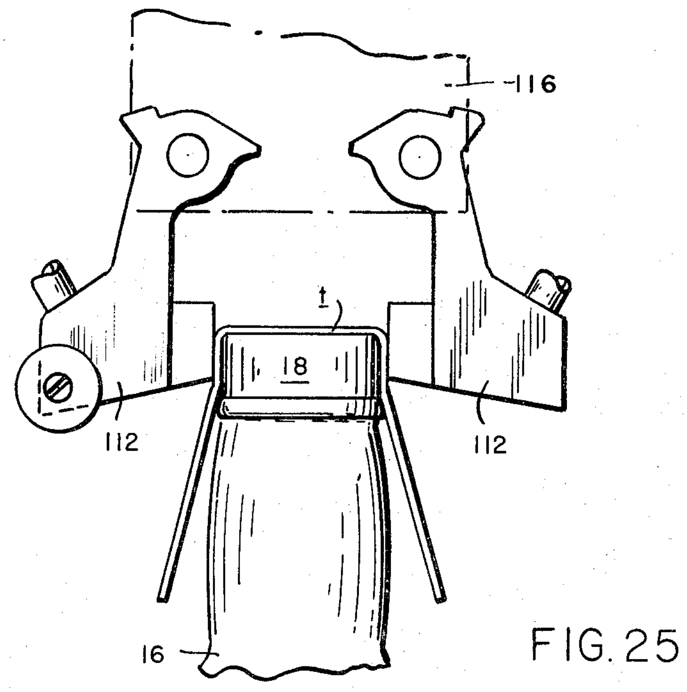
FIG. 25 is a fragmentary elevation showing the use of the apparatus for applying a sealing strip to a bottle with a long neck.

This apparatus can also be used to spot sealing strips on long-neck containers or bottles (FIG. 25) by the simple expedient of releasing the ends of the sealing strip as the sealing strip end holding means move downwardly along the sides of the closure instead of withholding said ends until the sealing strip end holding means and spotter are withdrawn. When there are no shoulders, the lower ends of the sealing strip will simply fall down adjacent the sides of the neck and hang there until they are squeezed into engagement with the neck of the bottle by the squeezing means referred to above.

Figure 22:
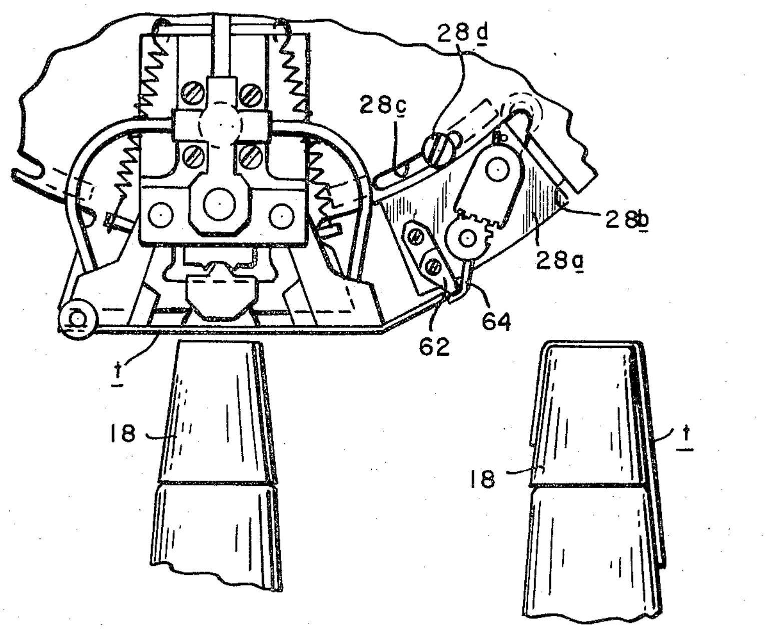
FIG. 22 is a fragmentary elevation showing a modification of the wheel adapted to apply sealing strips offset with respect to their centers for application to a container having a deep closure cap to insure overlapping of the sealing strip onto the bottle neck.
Figure 23:
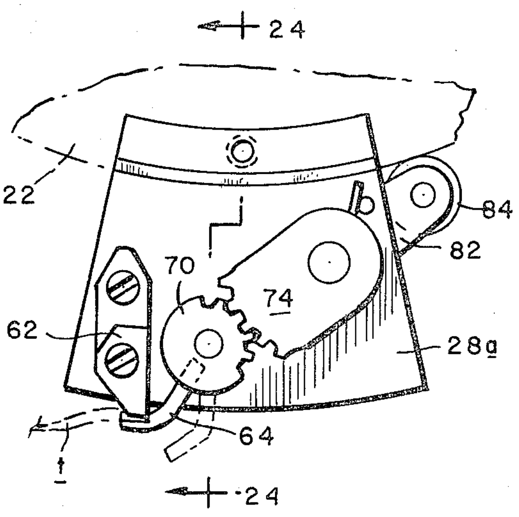
FIG. 23 is a fragmentary elevation showing the alternative structure.
Figure 24:
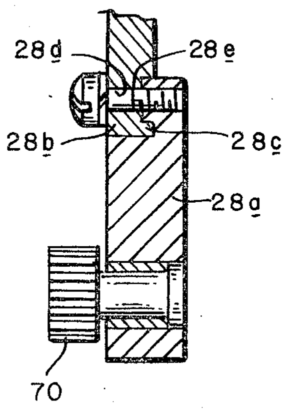
FIG. 24 is a section taken on the line 24—24 of FIG. 23.

Some containers, especially bottles having long necks and with correspondingly long closures (FIG. 22), require that the sealing strip be offset in one direction or the other with respect to its center so that at least one end of the sealing strip will extend downwardly beyond the lower edge of the closure onto the neck of the bottle. To enable such disposition of the sealing strip, there is provided herein means for presenting the sealing strip to the sealing strip end holding means and spotting means in an offset position. This is accomplished by mounting the jaws 62, 64 on a plate 28*a* set into a recess 28*b*, as shown in FIGS. 22, 23 and 24, in the wheel, peripherally longer than the plate on a track 28*c* for adjustment toward and away from the sealing strip holding and spotting means. A screw 28*d* extending through an arcuate slot 28*e* in the wheel and screwed into the plate 28*a* provides for fixing the plate with the desired amount of off-center setting. Since the possibility of bridging is not involved with this kind of neck and closure, the ends of the sealing strip at each side of the spotting member are released substantially simultaneously with the movement of the sealing strip into engagement with the top of the closure.

There are six pairs of sealing strip end holding members and six spotting means mounted on the wheel 22, and the cam 153 (FIGS. 28 and 29) which controls radial movement of each assembly, is mounted back of the wheel and is designed to hold the assemblies retracted throughout rotary movement following application of sealing strips to closures until they reach the adhesive application, whereupon, as indicated heretofore, they are moved radially outward a sufficient distance to take hold of the ends of the sealing strip and thereafter when they reach the tops of the bottles, the farther distance to spot the sealing strips and secure the end portions adjacent the center of the sealing strip to the sides of the closure. The first radial displacement (FIG. 28) takes place approximately at 155*a* and the second at 155*b*.

A cam 170 (FIG. 28) also located behind the wheel at the lower side, operates by engagement with the cam follower 84 to disengage the movable jaws 64 from the fixed jaw 62 so as to release the leading end of the sealing strip just before the sealing strip is folded over the edges of the closure and downwardly along the sides. As the movable jaw moves beyond the cam 170, it is returned to clamping position by the spring 78 and remains in this position until it reaches the top, whereupon it engages the cam 86 and is lifted away from the fixed jaw preparatory to a sealing strip's being drawn down into engagement with the fixed jaw for clamping.

Superatmospheric air pressure is supplied to the apparatus for the jet 90 to blow the free ends of the sealing strip away from the periphery of the wheel toward the guide 102; to the openings 134–134 in the sealing strip end holding members 112–112 to release and/or to disengage the sealing strip ends from the sealing strip end holding members; and subatmospheric air pressure is supplied to the openings 134–134 in the sealing strip end holding members to grip the ends of the sealing strips, by way of a manifold 172 (FIGS. 3 and 14 to 17). Referring specifically to FIGS. 14 to 17 inclusive, the manifold 172 comprises a block 174 fixed to the wheel 22 at its center of rotation and a block 176 rotatably mounted on the block 174. A spindle 178 is journaled in an opening 180 centrally of the block 174 with a portion extending inwardly thereof into an enlargement 180*a* and a portion extending outwardly thereof which supports the block 176. The outwardly extending portion of the spindle 178 projects through a central hole 182 in the block 176 into a centrally located recess 184 and is threaded to receive a retaining nut 186. The inner end of the spindle has a head 188 and a coiled spring 190 disposed about the spindle with one end engaged with a ball thrust bearing 188*a* mounted on the spindle next to the head and the other end with a shoulder 180*b* surrounding the opening 180, yieldably holds the block 176 against a spacer 192 placed between the front surface of the block 174 and the rear surface of the block 176, to permit free rotation of the block 174 and spacer 192 relative to the spindle 178 and the block 176. Rotation of the block 176 is prevented by means of an arm 194 secured diametrically to the front face of the block 176, a portion of which extends laterally therefrom for engagement of its distal end with a fixed part of the machine. Since the block 176 is held stationary, it provides means for connection to both pressure and vacuum conductors.

Figure 15:
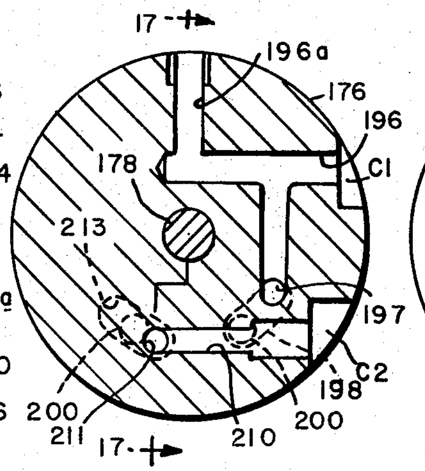
FIG. 15 is a section taken on the line 15—15 of FIG. 14.
Figure 16:
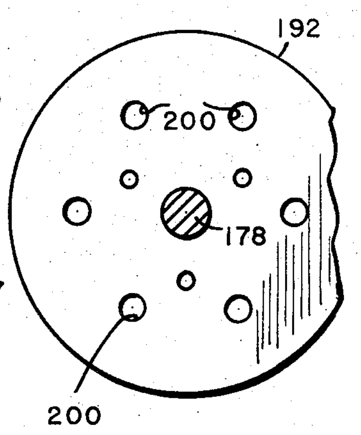
FIG. 16 is a section taken on the line 16—16 of FIG. 14.

Pressure fluid is supplied through a conductor C1 (FIGS. 3 and 14) to the manifold block 176 and from thence through an internal passage 196 (FIG. 15) and port 197 into an arcuate chamber 198, one end of which overlaps the circle of the centers of a plurality of ports 200 (FIG. 16) which extend axially through the spacer block 192. Each port 200 is connected with one end of a radially disposed chamber 202 in the block 174. One end of a hollow rod 204 is telescopically mounted in each chamber 202. The other end is fixed to a distributor 206 (FIGS. 3 and 10) mounted on the block 116 which provides for flow of pressure fluid through flexible tubes 206*a*—206*a* connected at one end to the distributor and at the other end to the sealing strip end holding members 112—112. Each rod 204 extends from the manifold through a leak-tight gland 208. The block 176 contains a second internal passage 210 (FIG. 15) which is connected at one end by a conductor C2 to a subatmospheric pressure chamber or vacuum pump and at its other end through a port 211 to an arcuate chamber 213. One end of the arcuate chamber 213 overlaps the circle of the ports 200 as does the chamber 198. The block 176, as related above, is fixed and the block 174 rotates relative thereto in a counterclockwise direction. When a port 200 in the spacer block 192 moves into registration with the upper end of the arcuate chamber 213, as shown in FIG. 15, the chamber 202 associated therewith is connected to the internal passage 210 and hence to the subatmospheric pressure conductor C2 thereby connecting the openings 134—134 in the sealing strip end holding members to the subatmospheric pressure so as to take hold of the ends of the sealing strip. This occurs, as indicated in FIG. 3, just after the wheel clears the lower end of the guide 100*a* in the second quarter of rotation of the wheel in a counterclockwise direction. The connection to the subatmospheric pressure conductor is maintained until the sealing strip is applied to the closure and the sealing strip applying mechanism is about to be retracted, whereupon the port 200 is moved beyond the lower end of the chamber 213. As the port 200 travels from the lower end of the chamber 213 to the lower end of the chamber 198 the connection to the subatmospheric pressure conductor is cut off. However, to break the vacuum between the ends of the sealing strip which are engaged with the openings 134—134 in the sealing strip end holding members, it is necessary to connect the openings with the source of superatmospheric pressure to release and/or blow these ends free and this is accomplished by movement of the port 200 into registration with the lower end of the chamber 198. The superatmospheric pressure is supplied only momentarily while the ports 200 travel the length of the arcuate chamber 198 which is located in the third quarter of rotation of the wheel in a counterclockwise direction and then is cut off by movement of the port 200 beyond the upper end of the chamber 198. Throughout rotation of the wheel pressure is supplied from the internal passage 196 through a radial passage 196*a* to the nozzle 90.

As related above, there are times when it is desirable to release the ends of the sealing strip at the moment of spotting and this is provided for herein by adjusting the block 176 relative to the block 174 to displace the arcuate chambers 198, 213 in a direction to cut off the vacuum and supply superatmospheric pressure simultaneously with the movement of the spotting means into engagement with the top of the closure. This is accomplished (FIG. 3) by providing in the face of the block 176 a wide diametrical recess 194a for accommodation of the arm 194, the latter containing a hole 194b so that when the arm is mounted in the recess it is centered on the outer end of the spindle 178. A cover plate 176a holds the arm over the spindle. The recess 194a is wider than the arm and so the block 176 can be adjusted angularly about the axis of the spindle relative to the arm a limited amount. The adjustment is effected by a screw 196c screwed into the block 176 against the proximal end of the arm.

The sealing strip holding and spotting assemblies are located at 60° intervals peripherally of the wheel and a sensing device 250 (FIG. 1) is mounted on the machine above the conveyor 20 so that when a container 16 on the conveyor is in a position to be moved thereby into a position below the wheel for application of a sealing strip thereto, the sealing strip holding and spotting assembly, which will be ready to apply a sealing strip to the top of the container, will have been supplied with a sealing strip. This is effected by a solenoid, triggered by the sensing device 250 which operates a valve in the subatmospheric connection to the picker for cutting off the subatmospheric pressure to the picker in the absence of a container on the conveyor at the required time.

As related above, there is a sealing strip squeezing means 14 (FIG. 1) situated beyond the wheel 22 in the direction of movement of the containers provided with squeezing pads 252—252 for pressing the free ends of the sealing strip, which were held away from the sides of the container or which were released at the time of the spotting operation, into engagement with the sides of the container. The construction and operation of this mechanism will not be described further herein since it is not part of the invention.

Rotation of the wheel 22 is imparted thereto through a horizontally disposed shaft 254 (FIGS. 1, 18 and 31) by means of a train of gears comprising a beveled gear 256 fixed to the shaft 254, a beveled gear 258 meshing with the beveled gear 256, a shaft 260 to which the beveled gear 258 is fixed, and a drive gear 262 also fixed to the shaft 260 which meshes with a driven gear 264 fixed to a shaft 266. The driven gear 264 has bolted to one side a pinion 268 which meshes with an intermediate gear 270, the latter in turn having bolted to it a pinion 272 which meshes with a drive gear 274 keyed to the shaft 24 to which the wheel 22 is secured. The drive gears 262 and 264 (FIGS. 18, 19, 20 and 21) are so designed that they make six complete turns in engagement with each other for each complete rotation of the wheel shaft 24 and hence so that they rotate the shaft 24 during the interval from one sealing strip holding and spotting assembly to the next at a speed controlled by the configuration of these gears. The drive gears are provided with an eccentricity such that the surface speed of the wheel driven thereby is substantially the same as the linear speed of the conveyor on which the bottles are supported when the strip holding and spotting assemblies are at the position for transfer of the sealing strips to the closures. This enables spotting the sealing strip accurately whether it be ecntered or offset a predetermined amount from the center. To accomplish this it is sometimes necessary to accelerate the wheel and at other times decelerate the wheel as an assembly moves into and out of position for applying the sealing strip to the closure as will appear hereinafter.

It is desirable to build this sealing strip applying apparatus with a wheel of a size such as to enable its use with labeling machines which deliver containers at different rates, to wit, at 5½, 7 and 9½ inch spacings. To this end the wheel is designed so that it rotates at a rate such that the assemblies carried thereby move at a linear speed which is substantially the same as the linear speed of the conveyor which delivers containers at a 7-inch spacing.

Figure 20:
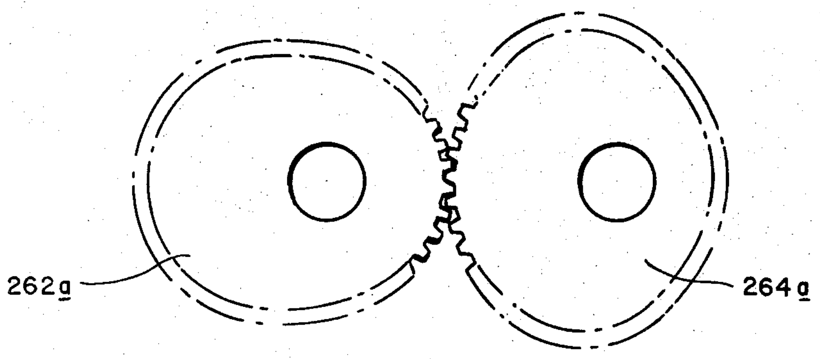
Figure 21:
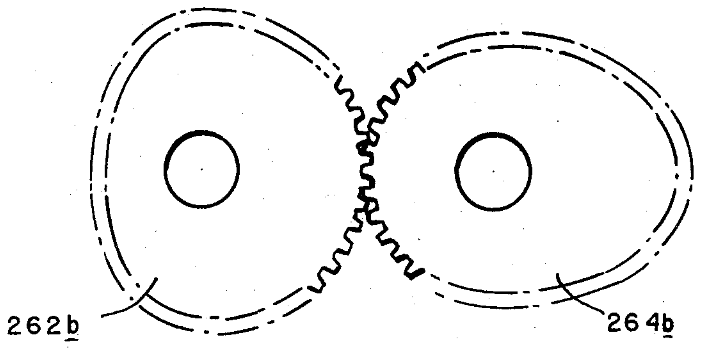

For this purpose there is provided in the drive, drive gears 262, 264 (FIG. 19) which are substantially concentric. If the apparatus is to be employed with a conveyor delivering at a 5½-inch spacing, the same wheel can be employed by increasing its speed each time an assembly moves to the place of application to keep up with the containers on the conveyor and with a conveyor delivering at a 9½-inch spacing by decreasing its speed. For that purpose the eccentric gears 262a, 264a shown in FIG. 20 are provided for the 5½-inch spacing and the eccentric gears 262b, 264b (FIG. 21) for the 9½-inch spacing.

The shaft 254 by means of which the wheel is driven is in turn driven through the intermediary of bevel gears 101 (FIG. 31), a shaft 103, a train of gears 105 and beveled gears 107, which are in turn driven by a main drive shaft 111 which is connected to a drive motor M.

Figures 1, 2:
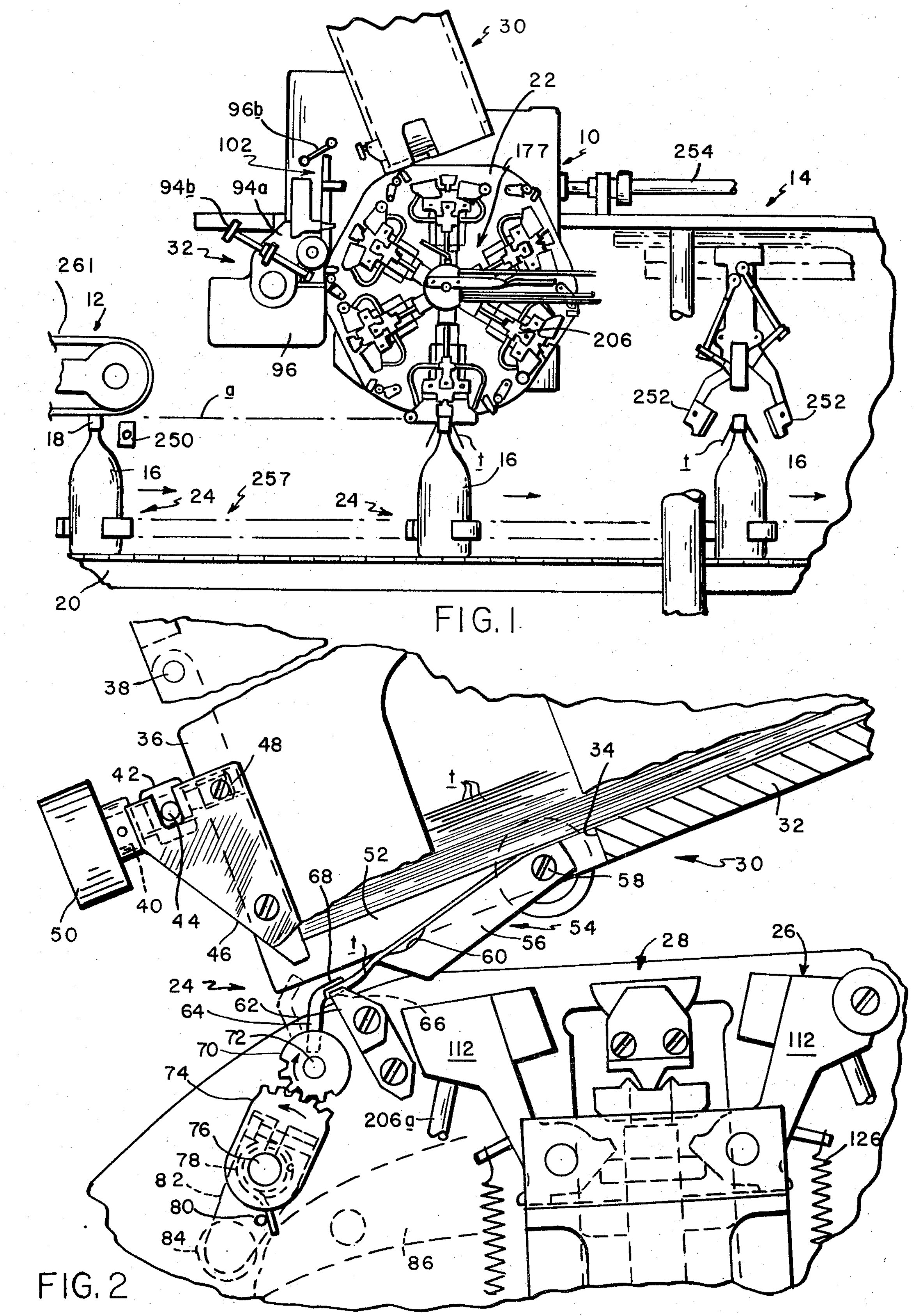
FIG. 1 is an elevation of the apparatus shown in relation to the preceding operation of applying labels to the sides of the containers and the succeeding operation of squeezing the end portions of the sealing strips into engagement with the sides of the containers.
FIG. 2 is an enlarged fragmentary elevation, partly in section, showing the upper part of the sealing strip transfer and applying wheel with a sealing strip drawn downwardly from the lower end of the magazine of sealing strips and clamped to the wheel by a gripper.

As shown in FIG. 1, the container clamps 24 are moved along at a predetermined spacing substantially parallel to the conveyor 20. As will be described in greater detail in my copending application, a conveyor 257 provides for effecting movement of the clamps and hence the containers moved along thereby in timed relation to the movement of the conveyor 20, so that a clamp will be in a position to move into clamping position as each container leaves the labeler. The clamp carrying conveyor is driven by sprocket 259 at the end of the conveyor, one of which is driven by a shaft 115 (FIG. 31). The containers are delivered at one of several predetermined spacings depending upon the labeling machine as related above and in a predetermined orientation with respect to their vertical axes by an endless hold-down belt 261 (FIG. 1), such as shown in my Pat. No. 2,940,630. The clamp-carrying conveyor 257, bottle conevyor 20, which may be an extension of the conveyor on the labeling machine, and the endless belt 261 which is also part of the labeling machine, are all driven at the same speed.

The radial movement relative to the shaft 24 of the sealing strip spotting means 28 is, as related above, effected by the cam 153 (FIGS. 28 and 29) and a follower 156, and although the spotting head 144 is adapted to yield a predetermined amount, if a container or bottle with a longer-than-usual neck was to be moved beneath the spotting head exceeding in height the distance the spotting head could yield, the bottle might be shattered. To eliminate this cam track 155 (FIG. 28) is provided with a gate 157 pivotally supported on the cam plate 153 on a pin 159 which extends through the cam plate and has secured to its rearwardly extending end an arm 161. The arm 161 extends laterally from the pin 159 from left to right, as shown in FIG. 28, and has screwed to its distal end a shackle 163. A rod 165 provided with an eye 167 is pivotally connected at its lower end by a pin 169 to the shackle and extends therefrom vertically with respect to the gate, loosely through a bracket 177 mounted on a part of the frame. A loading spring 175 is mounted on the rod between the bracket 177 and the butt of the eye 167. At the upper end of the rod 165 there is a plate 167 and at one side thereof a switch S. The gate yields each time an assembly moves through the spotting position so that in normal operation the rod 165 is constantly oscillating relative to the switch S but not sufficiently to effect is operation. As long as the bottles are all of uniform height the oscillation of the rod 165 will have no effect, but should a bottle with an unusually long neck be encountered, it will cause displacement of the rod 165 enough farther to actuate the switch S and hence stop the apparatus. Actuation of the switch S opens the motor drive and stops the machine so that the offending bottle can be removed.

As briefly stated above, the picker arm 56 is constantly oscillated so as to pick sealing strips from the sealing strip magazine and present them to the wheel for clamping thereto by the clamping jaws and is accordingly oscillated six times during each complete rotation of the wheel. Oscillation is effected as disclosed diagrammatically in FIG. 27 by meshing gears 267, 269, the gear 267 being driven by the gear 264 of the eccentric gears and the gear 269 driving a cam 271. The cam 271 in turn oscillates the picker 56 through an arm 273 fixed to the picker shaft 58 and a follower 275 mounted on the arm in engagement with the cam. As also related above, the picker is connected to a subatmospheric pressure conductor or vacuum pump so that when it is moved into engagement with a sealing strip at the lower end of the magazine, the sealing strip will be vacuum picked from the lower end of the magazine. Normally a constant subatmospheric pressure is maintained in the picker arm; however, to prevent a sealing strip from being removed from the magazine in the event that no container will be in position for application of the sealing strip, a valve is provided in the conductor which is adapted to be closed by a solenoid and the latter is adapted to be energized by a switch SW to hold this valve open while the finger is oscillated unless no bottle is present. Operation of the switch SW is effected by an arm 277 which has at one end a follower 279 engaged with a cam 281 rotated in common with the cam 271. If there is no bottle for application of the sealing strip thereto as determined by the detector 250, no current will be supplied to the switch SW and hence even though its contacts are closed by the cam follower 279, the solenoid will not be actuated and the valve will close so that the picker finger will not take a sealing strip from the magazine.

In operation of the machine the containers 16 are advanced from a labeling machine by means of the conveyor 20 to the sealing strip applying apparatus and while they travel toward the apparatus the pickers successively remove one sealing strip at a time from the bottom of the sealing strip magazine provided, of course, a container is sensed by the sensing device 250, withdraw it from the magazine, and present it to the adhesive applicator roll for application of adhesive.

Following application of adhesive the sealing strip end holding means take hold of the sealing strip at both ends and move it to a position above the container for application of the sealing strip thereto. The application consists in first spotting the sealing strip in a centered or offset position with respect to the closure, then folding the portions of the sealing strip at each side of the closure into engagement with the sides thereof while holding the ends spread laterally, retracting the sealing strip holding and spotting means and finally moving the container with a sealing strip so applied beyond the wheel to the sealing strip squeezing mechanism 14 for squeezing the free unattached ends of the sealing strip to the sides of the container. Optionally, as related above, if the neck of the bottle is long, the ends of the sealing strip may be released simultaneously with the spotting operation and allowed to drop downwardly along the opposite sides of the neck. These unattached ends will be squeezed into engagement with the neck as the bottle moves into the squeezing mechanism 14.

It should be understood that the present disclosure is for the purpose of illustration only and that this invention includes all modifications and equivalents which fall within the scope of the appended claims.

I claim:

1. An apparatus for adhesively applying sealing strips to closures at the tops of containers, a wheel for carrying sealing strips from a magazine of sealing strips to an adhesive applicator and from thence to a place of application to the closure, sealing strip applying assemblies on the wheel, each assembly comprising a rigid part mounted on the wheel for radial movement, a spotter mounted on the part, means yieldably holding the spotter in a predetermined position thereon, said spotter having a sealing strip engaging end, sealing strip end holding members pivotally mounted on the part at opposite sides of the spotter for pivotal movement toward and away from the opposite sides of the spotter, said sealing strip end holding members having sealing strip engaging end surfaces adapted to coincide with the plane of the end of the sealing strip end spotter when held away from the spotter, yieldable means operating on said spotter and sealing strip end holding members to hold the latter away from the spotter, means on the spotter and said part interengageable to limit said movement, means on the spotter and the sealing strip end holding members mutually engageable by relative movement to move the sealing strip end holding members toward each other, means for effecting radial movement of the part to cause the spotter to press the sealing strip against the closure and thereafter to move the sealing strip end holding members beyond the closure relative to the spotter, and means on the sealing strip end holding members confronting the sides of the spotter adapted by said relative movement to engage the sides of the closure after the spotter has pressed the sealing strip into engagement with the closure to press portions of the sealing strip at each side of the closure in engagement with the sides of the closure.

2. Apparatus for adhesively affixing sealing strips to the closure at the top of the container comprising a sealing strip transporting wheel and disposed thereabout in spaced relation in the direction of rotation a sealing strip holding magazine, an adhesive applicator roll and a conveyor for moving containers successively along a path such that their tops travel in a plane substantially tangent to the periphery of the applicator roll to a place for application of sealing strips thereto; sealing strip end gripping means mounted on the wheel at predetermined intervals for clamping sealing strips to the wheel for transporting of the sealing strips from the magazine for application of adhesive thereto and from thence to the place of application to the tops of the containers; characterized in that said gripping means clamp the leading end, only, of the sealing strip to the wheel and that the wheel turns at a speed such that the portion of the sealing strip trailing the gripping means is held away from the periphery of the wheel by centrifugal action as it travels with the wheel from the magazine toward the applicator roll.

3. Apparatus according to claim 2, further characterized in that the gripping means bends the leading end of the sealing strip longitudinally between its opposite edges.

4. Apparatus according to claim 2, wherein the gripping means comprises fixed and pivoted jaws interengageable by movement of the movable jaw into engagement with the fixed jaw to bend the leading end of the sealing strip longitudinally between its opposite edges.

5. Apparatus according to claim 2, characterized in that the peripheral surface of the wheel is spaced from the applicator roll so that the surface of the wheel and the surface of the applicator roll do not touch, that the gripping means supports the leading end of the sealing strip for movement along a path tangent to the surface of the applicator roll, and that there is a guide tangent to the applicator roll located between the magazine and the applicator roll adapted to guide the portion of the sealing strip held outwardly of the wheel into a plane tangent to the surface of the applicator roll.

6. Apparatus according to claim 5, comprising means at the upper end of the guide for holding the sealing strip centered with respect to the guide as it is moved therealong.

7. Apparatus according to claim 5, characterized in that the guide has a flat surface parallel to the axis of rotation of the wheel which contains openings connected to a source of subatmospheric pressure operable to pull and hold the sealing strip in engagement with said surface while permitting it to be drawn relative thereto in said plane of tangency with the applicator roll.

8. Apparatus according to claim 5, comprising means at the lower side of the wheel in the direction of rotation thereof situated in concentric relation to the wheel for maintaining the adhesive deposited on the sealing strip liquid.

9. Apparatus according to claim 2, comprising a heated pot for holding a quantity of molten adhesive, a pick-up roll rotatable in the adhesive for supplying adhesive to the applicator roll, and a guide supported by the pot, said guide having a surface extending downwardly from the applicator roll in concentric relation to the wheel, said surface containing a groove longitudinally thereof so that said surface has contact only with the adhesive-coated marginal edges of the sealing strip, said guide being operable by conductance of heat from the pot to maintain the adhesive on the sealing strip liquid as the sealing strip travels downwardly from the applicator roll toward the place of application.

10. Apparatus according to claim 2, comprising sealing strip holding and applying means on the wheel movable radially thereon toward the periphery of the wheel as the sealing strip leaves the applicator roll operable to take hold of both ends of the sealing strip, there being one such means associated with each gripping means, said holding and applying means being adapted to hold the sealing strip in a substantially flat plane perpendicular to a radius to the center of the wheel.

11. Apparatus according to claim 10, comprising means for releasing the leading end of the sealing strip from said gripper means to said holding and applying means at the place of applying the sealing strip to the closure.

12. Apparatus according to claim 10, characterized in that said holding means comprise openings connected with a source of subatmospheric pressure.

13. Apparatus according to claim 10, characterized in that at the place of applying the sealing strip to the closure there is means on the wheel for effecting further radial movement of the sealing strip holding means and applying means toward the plane in which the tops of the containers travel for pressing the sealing strip against the closure, and wherein said supporting means presses the center of the sealing strip against the closure and said holding means press portions of the sealing strip at each side thereof into engagement with the sides of the closure without releasing the ends of the sealing strip.

14. Apparatus according to claim 13, characterized in that there are means associated with the holding means operable in response to opposition of the closure to further radial movement of the holding means as the latter engages the closure to cause the holding means to fold portions of the sealing strip at either side of the spotting means over the diametrical edges of the closure into engagement with the sides of the closure without releasing said end portions of the sealing strip.

15. Apparatus according to claim 14, wherein there is means for releasing the ends of the sealing strip from the holding means and retracting the sealing strip end holding means and spotting means following the folding operation.

16. Apparatus according to claim 2, wherein there is a picker situated between the magazine and the wheel operable in timed relation to the intervals between sealer strip affixing assemblies to pull the leading end of a sealer strip from the magazine and move it into a position to be engaged by the sealer strip gripping means on the wheel adjacent the sealer strip and holding means, means connecting the picker to a source of subatmospheric pressure to provide for vacuum picking, said means including a valve which may at times be operated to break the vacuum, and a sensing device operable each time the picker is moved into picking position to break the vacuum in the event that there is no container present on the conveyor.

17. The combination with a transfer wheel for moving the lowermost sealing strip from a stack of such sealing strips, through a region for application of adhesive thereto and thereafter through a region for application of the adhesive coated sealing strip to the top of a container closure at the top of a container as it travels continuously through said latter region; a magazine of sealing strips having an opening adjacent the wheel; an adhesive applicator adjacent the wheel and spaced therefrom in the direction of rotation; and a conveyor located adjacent the wheel and spaced from the adhesive applicator roll in the direction of rotation of the wheel; a picker situated adjacent the magazine operable at intervals to remove the lowermost sealing strip from the magazine, said picker being adapted by engagement with the lowermost sealing strip intermediate its ends to pull the leading end down into proximity to the wheel, a plurality of gripper fingers on the wheel, each gripper finger as it is moved by the wheel to a position adjacent the free end of a sealing strip being operable to clamp said leading end of the sealing strip to the wheel, so that rotation of the wheel pulls the trailing end of the sealing strip from the magazine, each sealing strip as it travels form the magazine to the adhesive applicator roll being clamped solely at said leading end so that the trailing end is held away from the wheel by the centrifugal action, a guide situated between the magazine and the applicator roll with which the portion of the sealing strip trailing the leading end held by the gripper finger is held and guided to the applicator roll for application of adhesive to the outwardly facing surface thereof, a plurality of radially movable sealing strip applying assemblies mounted on the wheel, one associated with each gripper finger, each assembly comprising a spotter and a pair of transversely spaced, vacuum members, means for moving the vacuum members radially outward of the wheel just after the trailing end of the sealing strip leaves the applicator roll for securing the sealing strip at its ends to the wheel astride the spotter, radially movable means operable at the region at which the sealing strip is to be affixed to the container closure to effect radial movement of the spotter to press the adhesive-coated sealing strip against the top of the closure while the ends of the sealing strip are still held outspread by said vacuum members on said radially movable means, said radially movable means by such further radial movement effecting movement of said vacuum members toward each other concomitantly with said further radial movement to fold the sealing strip at each side of the closure into engagement with the sides of the closure while the end portions of the sealing strip continue to be held spaced laterally with respect to said closure and means for then disabling the vacuum members to release said ends of the sealing strip and retract said radially movable means.

18. Apparatus according to claim 17, wherein the picker is a vacuum member pivotally supported between the bottom opening of the magazine and the periphery of the wheel intermediate the ends of the bottom opening and closer to the forward end than to the rear end, and a cam rotatable with the wheel operable. as the wheel moves a gripper into position for clamping, to lower the picker and the leading end of the sealing strip picked by it from the magazine into engagement with the wheel adjacent the gripper.

19. Apparatus according to claim 17, wherein there is cam means fixed with relation to the wheel to open each gripper as it approaches clamping position and release it at clamping position and there is spring means for closing the gripper when released.

20. Apparatus according to claim 17 wherein the gripper finger is narrower in width than the width of the sealing strip so that it channels the leading end of the sealing strip intermediate its opposite parallel edges.

21. Apparatus according to claim 17, wherein the guide means is substantially tangent to the peripheral surface of the adhesive applicator roll so that it guides the sealing strip in a plane tangent to the peripheral surface of the applicator roll as the sealing strip is moved through said adhesive-applying region.

22. Apparatus according to claim 17, wherein the guide embodies a flat surface containing one or more orifice connected to a source of subatmospheric pressure by means of which the outswung sealing strip is held against said guide surface in a plane tangent to the peripheral surface of the adhesive applicator roll while being moved through said adhesive-applying region.

23. Apparatus according to claim 17, wherein the peripheral surface of the applicator roll is spaced from the peripheral surface of the wheel.

24. Apparatus according to claim 17, wherein a jaw is fixed to the periphery of the wheel at the location of each gripper with which the gripper is adapted, by engagement, to clamp the leading end of the sealing strip to the wheel, the locus of the jaws defining a circle tangent to the peripheral surface of the applicator roll so that rotation of the wheel carries the leading end of each sealing strip into tangential engagement with the applicator roll while being moved through said adhesive-applying region without engagement of the peripheral surface of the wheel with the applicator roll.

25. Apparatus according to claim 17, wherein the adhesive roll is wider than the sealing strip and contains medially of its peripheral surface a groove so that adhesive is applied only to the opposite marginal edges of the sealing strip.

26. Apparatus according to claim 17, wherein a receptacle is supported below the adhesive applicator roll, a pick-up roll is supported with a portion below its center immersed in adhesive in the receptacle and a portion above its center confronting the surface of the adhesive applicator roll, comprising means for moving the receptacle from said position in which the portion of the pick-up roll below the center is immersed in said adhesive to a depressed position in which the pick-up roll is withdrawn from the adhesive, and means for adjusting the pick-up roll radially with respect to the axis of the adhesive applicator roll to vary the distance between the confronting surfaces and thereby the thickness of the adhesive.

27. Apparatus according to claim 26, comprising means for rotating the pick-up roll and adhesive applicator roll at different rates such that the surface speed of the adhesive applicator roll exceeds that of the pick-up roll.

28. In an apparatus for adhesively applying sealing strips to closures at the tops of containers, a transporting and applying wheel, a magazine for sealing strips and an adhesive applicator disposed peripherally thereof, said transporting and applying wheel being operable to carry sealing strips from said magazine of sealing strips to said adhesive applicator for application of adhesive thereto and from thence to a place of application to the closure, a plurality of peripherally spaced sealing strip applying mechanisms on the wheel, each mechanism comprising spaced sealing strip end holders for holding a sealing strip at its opposite ends outspread in a substantially flat plane, and spotter means intermediate said sealing strip end holders located in a plane at the inner side of the sealing strip, said sealing strip end holders and spotter being movable radially outwardly from the wheel to cause the spotter to press the sealing strip at the place of spotting against the top of the closure, said sealing strip end holders being movable relative to said spotter, after the latter has pressed the sealing strip against the top of the closure, a predetermined distance beyond the top of the closure in the direction of the bottom of the container and toward each other and the sides of the closure without letting go of said ends, concomitantly to fold portions of the sealing strip between said ends and said affixed center and press them into engagement with the sides of the closure.

29. Apparatus according to claim 28, wherein the containers are supported in a plane perpendicular to a radius through the axis of the wheel at the place of spotting and wherein said spotter embodies a pad pivotally supported for movement relative theerto about an axis parallel to said plane.

30. Apparatus according to claim 28, comprising a conveyor for moving containers along at a predetermined spacing through said place of application, and means for rotating the wheel at a rate such that as each assembly is moved into and out of said position, it travels at a linear speed corresponding substantially to the linear speed of the conveyor.

31. Apparatus according to claim 30 wherein there is a conveyor for moving containers at a predetermined spacing comprising means for effecting rotation of the wheel either to increase the rate of rotation of the wheel as an assembly approaches said position to catch up with containers which are more closely spaced than said predetermined spacing or to decrease the speed to wait for containers which are more distantly spaced than said predetermined spacing.

32. A sealer strip applying magazine according to claim 28, comprising a conveyor for moving the containers to said wheel for application of sealer strips thereto by the affixing means on the wheel, container spacers associated with the conveyor, and driving mechanism effecting movement of the wheel at the conveyor so that rotation of the wheel brings the sealer strip affixing means successively into a position opposite the tops of successive containers on the conveyor.

33. A sealer strip applying apparatus comprising a wheel rotatable about a predetermined axis, a plurality of assemblies mounted on the wheel, a sealing strip magazine, an adhesive applicator, and a conveyor supported peripherally of the wheel, said assemblies being adapted to take sealing strips from the magazine, present them to the applicator for application of adhesive and present the adhesive-coated sealing strips to the tops of containers resting on the conveyor for application thereto, means mounting the assemblies on the wheel for radial movement from retracted positions to extended positions, said assemblies embodying sealer strip end holding members provided with orifices adapted to be connected, at times, to subatmospheric pressure, a manifold comprising a part fixed with respect to the wheel and a part rotatable with the wheel, subatmospheric and superatmospheric pressure conductors connected to the fixed part and ports in the fixed and movable parts movable into registration by rotation of the wheel to connect the sealer strip end holding members to the subatmospheric conductor as the assembly moves toward the affixing position, disconnect them from the subatmospheric pressure conductor at said affixing position but without breaking the vacuum established by said subatmospheric pressure connection while the assembly is being moved radially to press the sealer strip against the closure, and thereafter simultaneously with retraction of the assembly connect the sealed strip end holding members to the superatmospheric pressure conductor to release the ends of a sealer strip held by said sealer strip end holding means.

34. Apparatus according to claim 33, wherein said fixed part of the manifold contains a first passage connected to the superatmospheric pressure conductor, a second passage connected to the subatmospheric pressure conductor, and peripherally spaced first and second arcuate chambers with which the first and second passages are connected, and said movable part containing peripherally spaced ports movable relative to the fixed part along a path to bring them successively into registration with the chamber connected to the subatmospheric pressure conductor and thereafter the chamber connected to the superatmospheric pressure conductor.

35. Apparatus according to claim 34, wherein the arcuate chambers are peripherally spaced so that while a port travels from one to the other the vacuum established by registration with the first chamber is maintained until the port reaches the second chamber.

36. Apparatus according to claim 33, wherein there is a nozzle mounted on the first part and connected to the first passage and said nozzle is disposed at an angle inclined upwardly substantially midway between the sealer strip magazine and the adhesive-applying roll for directing a jet of air toward the guide to press the sealer strips as they travel along the guide into engagement therewith.

37. Apparatus according to claim 33, comprising means for adjusting the fixed part relative to the rotatable part to break the vacuum substantially simultaneously with movement of the assembly radially to effect pressing the sealer strip against the closure.

38. Apparatus according to claim 33, comprising a cam plate fixed with respect to the wheel along which the cam followers travel and are moved and so move the assemblies radially, said track having a portion concentric with the axis of rotation of the wheel within which the followers travel and hold the assemblies retracted, a second portion situated at a greater distance from the center of rotation in which the cam followers effect a radial movement of the sealer strip end holding members into engagement with the ends of a sealer strip as it leaves the adhesive-applying means, and a third portion situated at a still greater radial distance from the center of rotation of the wheel at the position for affixing sealer strips to the closure to effect radial movement of the sealer strip end holding and spotting member so as to affix the sealer strip to the top and sides of the closure without releasing the ends of the sealer strip.

References Cited

UNITED STATES PATENTS

| | | | |
|---|---|---|---|
| 2,984,378 | 5/1961 | Gunter | 156—489 |
| 3,030,262 | 4/1962 | Gunter | 156—489 X |
| 3,049,166 | 8/1962 | Clark | 156—Dig. 15 X |
| 3,600,254 | 8/1971 | Clark | 156—489 X |

ROBERT F. BURNETT, Primary Examiner

J. C. GIL, Assistant Examiner

U.S. Cl. X.R.

156—475, 486, 489, 556, 567, 571, 578, DIG. 15